US009710230B2

(12) United States Patent
Pruneri et al.

(10) Patent No.: US 9,710,230 B2
(45) Date of Patent: Jul. 18, 2017

(54) PROCESS FOR QUANTUM RANDOM NUMBER GENERATION IN A MULTIMODE LASER CAVITY

(71) Applicants: FUNDACIÓ INSTITUT DE CIÈNCIES FOTÒNIQUES, Barcelona (ES); INSTITUCIÓ CATALANA DE RECERCA I ESTUDIS AVANCATS, Barcelona (ES)

(72) Inventors: Valerio Pruneri, Barcelona (ES); Carlos Abellán, Barcelona (ES); Waldimar Amaya, Barcelona (ES); Morgan Wilfred Mitchell, Barcelona (ES)

(73) Assignees: FUNDACIÓ INSITITUT DE CIÈNCIES FOTÒNIQUES, Barcelona (ES); INSTITUCIÓ CATALANA DE RECERCA I ESTUDIS AVANCATS, Barcelona (ES)

( * ) Notice: Subject to any disclaimer, the term of this patent is extended or adjusted under 35 U.S.C. 154(b) by 160 days.

(21) Appl. No.: 14/923,495

(22) Filed: Oct. 27, 2015

(65) Prior Publication Data
US 2017/0115960 A1    Apr. 27, 2017

(51) Int. Cl.
*H03B 29/00*   (2006.01)
*G06F 7/58*    (2006.01)
*H01S 3/11*    (2006.01)
*H01S 5/065*   (2006.01)
*G06N 99/00*   (2010.01)
*H01S 5/30*    (2006.01)
*H01S 5/062*   (2006.01)
*H04L 9/08*    (2006.01)

(52) U.S. Cl.
CPC ............ *G06F 7/588* (2013.01); *G06N 99/002* (2013.01); *H01S 3/11* (2013.01); *H01S 3/1106* (2013.01); *H01S 5/065* (2013.01); *H01S 5/0623* (2013.01); *H01S 5/0657* (2013.01); *H01S 5/3013* (2013.01); *G06F 2207/58* (2013.01); *H01S 5/0652* (2013.01); *H01S 5/06213* (2013.01); *H04L 9/0869* (2013.01)

(58) Field of Classification Search
CPC ...... H01S 3/1106; H01S 5/0657; H01S 5/065; H01S 5/3013; H01S 3/11; H01S 5/06213; H01S 5/0652; H01S 5/0623; G06N 99/002; G06F 7/588; G06F 2207/58; H04L 9/0869
USPC ................ 359/344, 107; 372/50.11; 708/191
See application file for complete search history.

(56) References Cited

U.S. PATENT DOCUMENTS

2013/0036145 A1 *  2/2013  Pruneri .................. G06F 7/588
                                                         708/191

OTHER PUBLICATIONS

Feihu Xu et al., "Ultrafast Quantum Random Number Generation Based on Quantum Phase Fluctuations", Optics Express 12366, vol. 20, No. 11, May 21, 2012.

(Continued)

*Primary Examiner* — Arnold Kinkead
(74) *Attorney, Agent, or Firm* — Kinney & Lange, P.A.

(57) ABSTRACT

A process and system for producing random numbers by means of a quantum random number generator is disclosed, comprising the steps of operating a multimode laser in a laser cavity with periodic modulation of a net gain, and detecting the random intensity pattern produced by the inter-mode beating occurring within the laser cavity. The numbers produced are truly random and a minimal number of elements is required for operating the system.

8 Claims, 2 Drawing Sheets

(56) References Cited

OTHER PUBLICATIONS

Z.L. Yuan et al., "Robust Random Number Generation Using Steady-State Emission of Gain-Switched Laser Diodes", Applied Physics Letters 104, 2014.
Atsushi Uchida et al., "Fast Physical Random Bit Generation With Chaotic Semiconductor Lasers", Nature Photonocs, vol. 2, Dec. 2008.
C. Abellan et al., "Ultra-Fast Quantum Randomness Generation by Accelerated Phase Diffusion in a Pulsed Laser Diode", Optical Society of America, 2014.
Simone Tisa et al., "High Speed Quantum Random Number Generation Using CMOS Photon Counting Detectors", IEEE Journal of Selected Topics in Quantum Electronics, vol. 21, No. 3, May/Jun. 2015.

\* cited by examiner

PROCESS FOR QUANTUM RANDOM NUMBER GENERATION IN A MULTIMODE LASER CAVITY

BACKGROUND

The present invention relates to random number generators (RNGs), in particular to generators based on the intrinsic randomness of quantum observables in multimode laser cavities with variable gain or loss.

Random numbers are by definition unpredictable, and a sequence of random numbers shows no predictable patterns. A random number generator (RNG) is a computational or physical device designed to generate random numbers. RNGs can be classified in pseudo-RNGs (PRNGs), which are computational algorithms, and true-RNGs (TRNGs). TRNGs are physical devices and can be subdivided into classical RNGs (CRNGs) based on classical processes such as chaotic dynamics that may be difficult to predict but are in principle deterministic, and quantum RNGs (QRNGs) based on quantum effects.

Current commercial RNG devices are based on the spatial distribution of single photons [1], chaotic dynamics in semiconductor lasers [2], CMOS metastability [3], single photon detection in arrays of single photon detectors [4], and phase diffusion in semiconductor lasers [5,6], among many other schemes.

The patent application "ultrafast quantum random number generator and system thereof" by Pruneri et al [5] discloses a QRNG based on measuring quantum phase diffusion in a pulsed single-mode semiconductor laser. By modulating the laser from below to above threshold, optical pulses with nearly identical intensities and completely randomized phases are generated. Then, by using an external interferometer, the random phases are translated into random amplitudes, which can be digitised with a proper detector. Instead of one laser source and an interferometer, two laser sources can be used together with a combiner. The technique allows for ultrafast operation regimes, and recent publications have shown bitrates of 40-Gbps [7,8]. However, the need for an external interferometric element or two lasers that are spectrally matched in emission and coupling optics complicates the layout as it increases the number of elements, the overall dimension of the QRNG device, and, in some cases the performance of the QRNG is affected by the stability of the components. For example, in the case of the two lasers their emission wavelength spectra have to be narrow (single mode), matched and maintained over time and this is not always easy to achieve due to intrinsic instability and environmental changes.

There is thus a need of a smaller form factor RNG source, with reduced dimensions (footprint) that maintains the high speed and quantum mechanical entropy properties.

SUMMARY

It is an aim of embodiments of the invention to provide a process for quantum random number generation and a system therefore that overcome the limitations of the prior art. Embodiments of the invention are based on the transformation of the random phases of the modes of a multimode laser into random intensity patterns that can be detected with a photodiode. For this purpose, embodiments of the invention comprise the steps of utilizing a multimode laser whose net gain per round trip is modulated periodically from below threshold to above threshold and back, for example by means of an electrical pulse driver, maintaining net gain per round trip positive for a longer period than the round trip time of the cavity, maintaining net gain per round trip negative for a longer period than the round trip time of the cavity to randomise the phases between different cavity modes, and detecting the resulting beating pattern, for example by utilizing a fast photodiode (PIN).

There are many different schemes of a multimode laser for implementing embodiments of the invention, for example a Fabry Perot cavity semiconductor laser whose multimode response is achieved through proper wavelength selective reflectors, a waveguide semiconductor laser whose multimode response is achieved through the difference in frequency of transversal or polarization modes or a fiber ring laser comprising fiber Bragg gratings for mode selection and a semiconductor optical amplifier as gain medium. Any laser cavity that has at least two modes is in principle suitable as long as the net gain, i.e. the difference between gain and loss in the cavity, of at least one of the at least two modes can be properly modulated, in particular to achieve sufficiently negative net gain values and, correspondingly, large phase diffusion.

For modulating the net gain, the laser gain, the loss of the cavity or, alternatively, both the laser gain and cavity loss can be modulated. In each modulation cycle, the laser experiences two working regimes: (i) above threshold, in which the different modes of the multimode laser will create a random intensity pattern characterized by the frequency spacing and the relative phases between the modes, and (ii) below threshold, in which the laser cavity field is forced to operate in a spontaneous emission regime, resetting and randomising in this way the relative phases between the modes for the next modulation period. Failing to keep the laser below threshold for sufficient time would fail to randomise the relative phase, and thus would introduce correlations among subsequent pulses. Thanks to the invention, it is possible to provide quantum numbers without any external or interferometric element, with a very compact (small footprint) system, especially when integrated photonic circuits are used to build it.

BRIEF DESCRIPTION OF THE DRAWINGS

To complete the description for a better understanding of the invention a set of drawings is provided. Said drawings illustrate preferred embodiments of the invention, which should not be interpreted as restricting the scope of the invention, but just as an example of how the invention can be embodied.

DETAILED DESCRIPTION an embodiment of the invention, in which a two-mode laser is obtained via selective filtering within the cavity of a multimode laser diode (MMLD). The MMLD is modulated by means of an electrical pulse driver (PD). Since only two modes are selected in the example, the beating pattern when detected with, for example, a photodiode (PIN), shows cosine dependence with a frequency given by the mode spacing (frequency difference between modes $m_2$ and $m_3$ in the figure) and initial phase $\phi_{init}$ given by the phase difference between the modes in that particular period. An optical isolator (OI) can be added to avoid optical back reflections into the laser cavity.

The resulting intensity pattern shows amplitude modulation at the mode spacing frequency, due to the dual-mode emission, with a random initial phase. Hence, sampling subsequent pulses produces digitization of random amplitudes, since each pulse generated by modulating the effective laser cavity gain is built on the random initial phase of the two modes. The larger the number of modes involved in the beating, the more complex the resulting intensity pattern and the larger the number of random samples that can be extracted within each modulation period of the net gain. The modes of the multimode laser may be longitudinal, transversal or polarization modes in the laser cavity, for example.

Note that modulating the net gain of the laser cavity is important for the system to provide quantum random samples (numbers). If the net gain were kept constant above threshold, mode beating would still exist but correlations would be present between the pulses leaving the cavity. If the net gain were modulated with a frequency correlated to the round trip of the cavity, this mode beating could become what is known as mode-locking producing a train of periodic pulses.

A similar structure for an integrated version of the scheme could be made as follows: placing the active material inside or on top of a photonic integrated circuit (PIC), and using the cleaved facets of the chip itself as mirrors. The spectral filtering can be achieved either by placing gratings on both sides of the active material, or by using a ring-like structure.

Figure 1:
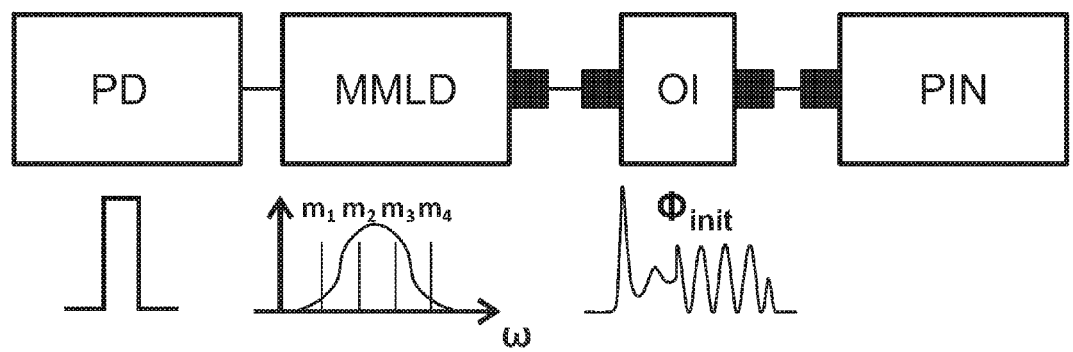
FIG. 1 shows a possible set up for putting the invention into practice.
Figure 2:
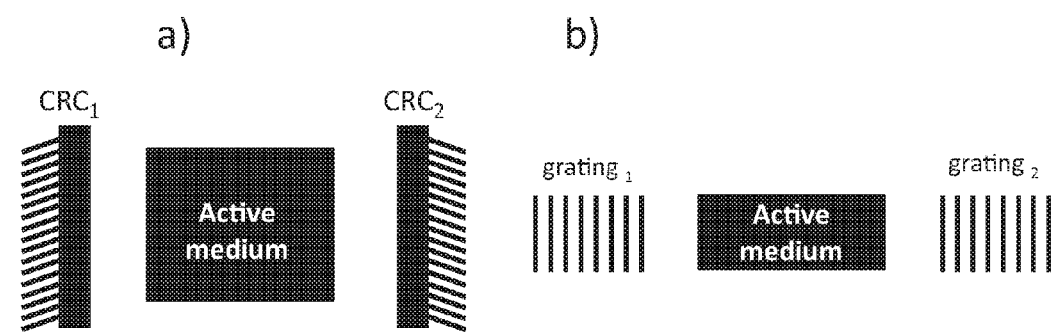
FIG. 2 shows another set up.

In FIG. 2 an active material such as InP or InGaAsP is placed in a Fabry Perot cavity with highly reflective end mirrors. The spectral reflectivity of the mirrors can be engineered so that the cavity itself acts as a filter allowing only a few modes to oscillate. In FIG. 2a the two reflective mirrors can filter two desired modes ($CRC_{1,2}$). By electrically pumping the active medium, lasing can take place and a broad multimode optical spectrum is generated. The separation between the mirrors and the refractive index of the material in between determines the mode spacing. Finally, if the cavity is designed so that the mode spacing is smaller than the detection bandwidth, the inter-mode beating of the laser can be resolved with a fast photodiode (PIN).

In FIG. 2b the active material is deposited on top of a photonic chip and using the reflection produced by the cleaved facets of a chip the cavity is created. The spectral filtering is obtained by means of gratings.

Figure 3:
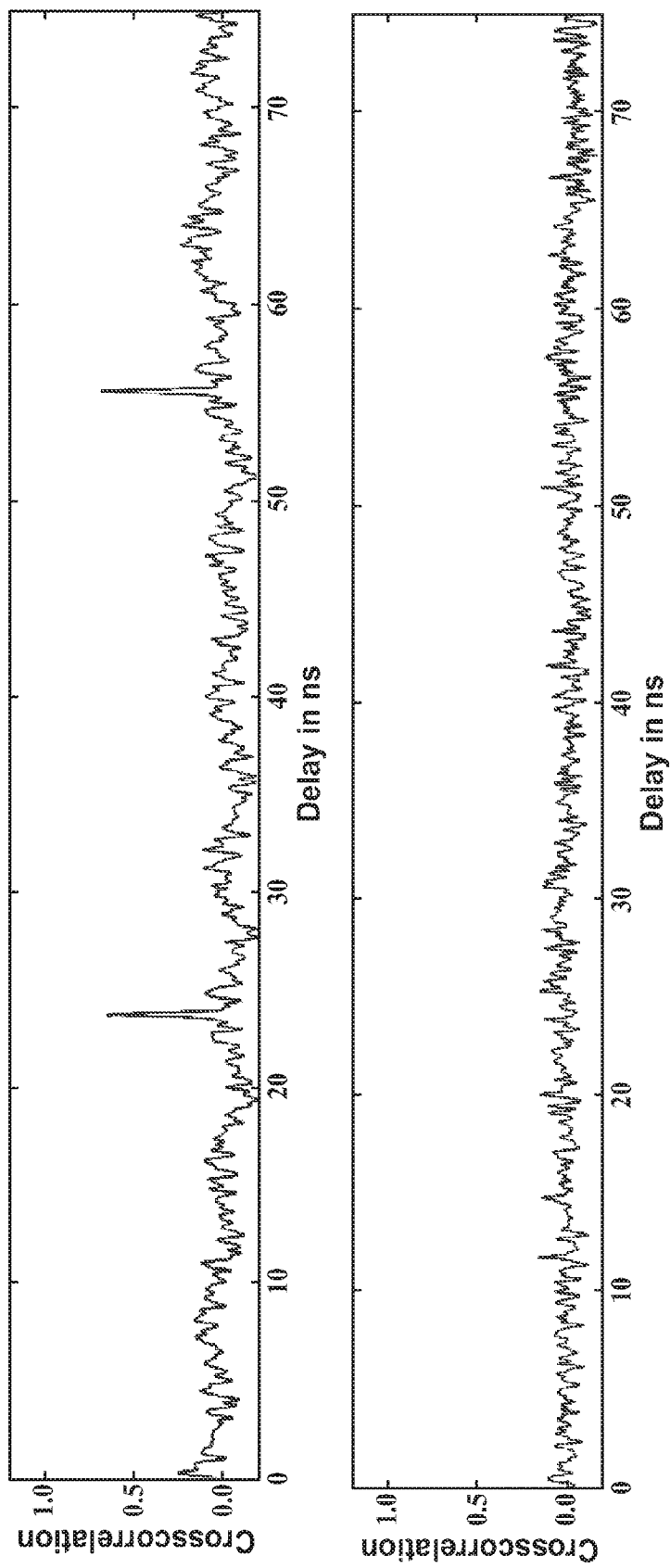
FIG. 3 shows the autocorrelation function for two operating regimes of a multi-mode laser.

FIG. 3 shows the autocorrelation function for two operating regimes: (upper picture) the laser never reaches the working regime below threshold) and (lower picture) the laser successfully reaches the working regime below threshold. In the top picture, since the laser never reaches the spontaneous emission region, the correlation function reveals that patterns between subsequent pulses are similar (shown as peaks in the figure). Instead, in the bottom picture, no correlation is observable due to complete randomization of the phase between subsequent pulses.

In some embodiments, the multimode laser may be operated at a non-resonant frequency, such that the locking mechanism between longitudinal modes of the laser cavity is prevented.

Although the examples described above employ a semiconductor laser diode as the multimode laser, in other embodiments the multimode laser may be implemented as a solid state laser, a fibre laser or a waveguide laser In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice components, configuration, etc.), within the general scope of the invention as defined in the claims.

REFERENCES

[1] G. Ribordy et al, "Method and apparatus for generating true random numbers by way of a quantum optics process", U.S. Pat. No. 7,519,641 B2 (2009).
[2] A. Uchida et al, "Fast physical random bit generation with chaotic semiconductor lasers", Nat. Photonics, vol. 2, 12, 728-732 (2008)
[3] H. C. Herbert et al, "Digital random number generator", US20100332574A1 (2010)
[4] S. Tisa et al, "High-Speed Quantum Random Number Generation Using CMOS Photon Counting Detectors", IEEE Journal of Selected Topics in Quantum Electronics, (21) 3, 23-29 (2015)
[5] V. Pruneri et al, "Ultrafast quantum random number generation process and system therefor", US2013/0036145 A1
[6] F. Xu et al, "An ultrafast quantum random number generator based on quantum phase fluctuations", Opt. Express 20, 12366 (2012)
[7] Z. L. Yuan et al, "Robust random number generation using steady-state emission of gain-switched laser diodes", Appl. Phys. Lett. 104, 261112 (2014)
[8] C. Abellan et al, "Ultra-fast quantum randomness generation by accelerated phase diffusion in a pulsed laser diode", Opt. Express 22, 1645 (2014)

The invention claimed is:
1. A process for producing random numbers by means of a quantum random number generator, the process comprising:
   a) operating a multimode laser in a laser cavity with periodic modulation of a net gain from positive to negative values and vice-versa;
   b) maintaining the net gain per round trip positive over a period longer than a round trip time of the laser cavity;
   c) maintaining the net gain per round trip negative over a period longer than the round trip time of the laser cavity; and
   d) detecting a resulting random beating pattern between multiple modes of the multimode laser.

2. A process according to claim 1 where the net gain is modulated through an electrical pulse driver.

3. A process according to claim 1 where the resulting random beating pattern between the multiple modes is detected by a fast photodiode.

4. A process according to claim 1 further comprising selecting a number of frequencies within the laser cavity so as to reduce a number of modes involved in the beating pattern.

5. A process according to claim 1 in which the laser is operated at a non-resonant frequency, such that a locking mechanism between longitudinal modes of the laser cavity is prevented.

6. A process according to claim 1 further comprising optically isolating signals in the laser cavity so as to avoid reflected optical power into the laser cavity.

7. A process according to claim 1 in which the modes of the multimode laser are longitudinal, transversal or polarization modes in the laser cavity.

8. A process according to claim 1 in which the multimode laser is a semiconductor laser diode, a solid state laser, a fibre laser or a waveguide laser.

\* \* \* \* \*

UNITED STATES PATENT AND TRADEMARK OFFICE
CERTIFICATE OF CORRECTION

PATENT NO. : 9,710,230 B2
APPLICATION NO. : 14/923495
DATED : July 18, 2017
INVENTOR(S) : Valerio Pruneri et al.

It is certified that error appears in the above-identified patent and that said Letters Patent is hereby corrected as shown below:

In the Specification

Column 1, Line 40:
Delete "40-"
Insert --40-80--

Signed and Sealed this
Thirty-first Day of July, 2018

Andrei Iancu
*Director of the United States Patent and Trademark Office*